INVENTOR
Ernest Wildhaber
BY
ATTORNEY

Feb. 3, 1942. E. WILDHABER 2,271,753
GEAR CUTTER
Filed Sept. 16, 1938 3 Sheets-Sheet 2

INVENTOR
Ernest Wildhaber.
BY
M Schlesinger
ATTORNEY

Feb. 3, 1942.  E. WILDHABER  2,271,753
GEAR CUTTER
Filed Sept. 16, 1938   3 Sheets-Sheet 3
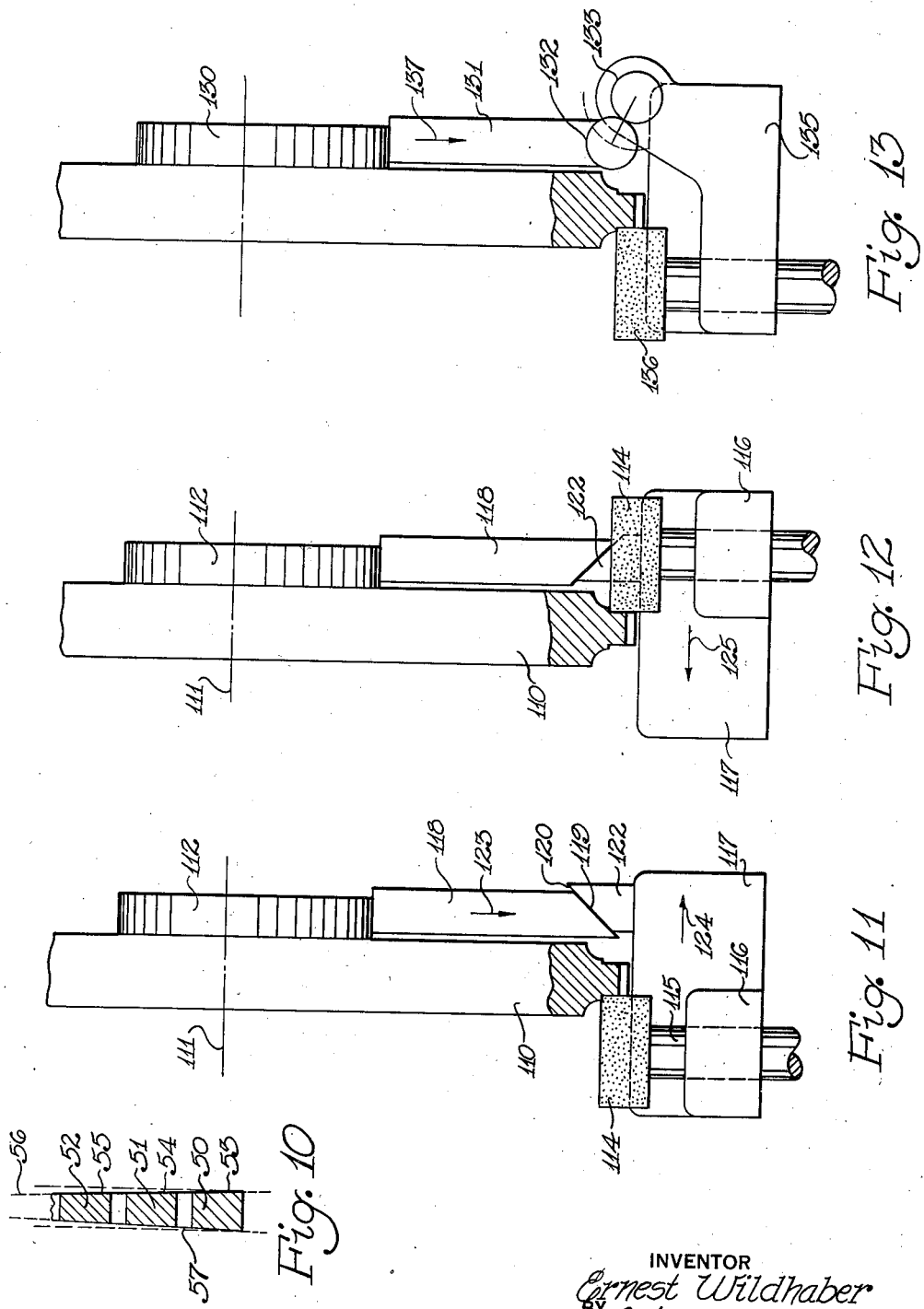
INVENTOR
Ernest Wildhaber
BY
ATTORNEY Patented Feb. 3, 1942

2,271,753

UNITED STATES PATENT OFFICE 2,271,753

GEAR CUTTER

Ernest Wildhaber, Brighton, N. Y., assignor to Gleason Works, Rochester, N. Y., a corporation of New York Application September 16, 1938, Serial No. 230,291

27 Claims. (Cl. 29—103)

The present invention relates to disc-type gear cutters for cutting straight toothed cylindrical and tapered gears.

One object of the invention is to provide a cutter for rough and finish-cutting gears according to the process of my prior applications, Serial Nos. 164,340 and 181,177, filed September 17, 1937, and December 22, 1937, respectively, which may have an increased number of cutting blades and therefore be of longer life, or which may be made of smaller diameter with the same number of cutting blades and therefore be made cheaper than the cutting tools described in said prior applications.

A further object of the invention is to provide a relatively inexpensive tool for rough-cutting gears according to the processes of said prior applications.

Another object of the invention is to provide a process and apparatus for making the improved cutter of the present invention.

Still another object of the invention is to provide a process and apparatus for sharpening the improved cutter.

Other objects of the invention will appear hereinafter from the specification and from the recital of the appended claims.

In my prior applications above mentioned, I have disclosed processes for cutting gears in which a rotary disc cutter is employed that has a plurality of cutting blades arranged part-way around its periphery with a gap between the last and first blades. These processes may be employed for finish-cutting gears directly from the solid gear blank and in this case the cutter will have a plurality of rough-cutting blades followed by a plurality of finish-cutting blades and the gap will then be between the last finish-cutting blade and the first roughing blade. During finish-cutting, at least, a relative feed movement is produced between the rotating cutter and the blank lengthwise of a tooth space of the blank. When the gap in the cutter comes abreast of the blank, the blank is indexed. During the rough-cutting, the rotating cutter may be held against relative lengthwise movement or, if desired, a relative lengthwise movement may be produced in a direction opposite to that employed during the finish-cutting operation.

In the cutters described in my prior applications both the roughing and finishing blades have side-cutting edges. These are of curved profile and the profiles of the side-cutting edges of different blades differ from one another in accordance with the different points along the length of the teeth at which they are to cut. Moreover, the roughing blades may be made of progressively increasing height to cut progressively deeper into the gear blank to the full depth of the tooth space as a limit. Further, each of the blades is sharpened so that its cutting edge or edges extends or extend for its full height.

The improvement of the present invention consists in a new form and arrangement of roughing blades. In a cutter made according to the present invention, the roughing blades are made to cut on their tops only and the tops of successive blades are arranged at progressively increasing distances from the axis of the cutter, and the blades themselves are made of progressively decreasing width in such way that the points of intersection of corresponding sides of successive blades with the tops of those blades lie on the profile of the tooth space which is to be rough-cut. Preferably the sides of the roughing blades are made of straight profile perpendicular to the axis of the cutter. Since the roughing blades cut with their tops only, they operate like a broach and may be sharpened so that they are of uniform height but so that each blade is of less height than the depth of the tooth space to be cut, the full depth of the tooth space being obtained by arranging the blades so that the top cutting edges of successive blades lie in a spiral about the axis of the cutter. This makes it possible to provide many more roughing blades in a cutter of a given diameter, especially in a cutter of the segmental type, for, because of the relatively small depth of the roughing blades, the blades are stronger than where the roughing blades are each of full height up to the full depth of the tooth space as a limit. Moreover, the cutter of the present invention may be made quite cheaply and simply because the sides of the roughing blades are all straight.

The finishing blades of a combined roughing and finishing cutter made according to this invention are made like the cutters of my prior applications. For tapered gears, this means that the side-cutting edges of successive finishing blades have different profile shapes to cut the correct profile shapes at different points along the length of a gear tooth. The finishing blades of a cutter made according to this invention may, however, also be made of controlled height so as to obtain maximum strength.

In manufacturing a cutter according to the present invention, both the side and the top faces of the blades are provided with relief back of their front faces. The relief on the tops of the blades may be provided either according to known relieving processes, by imparting a relieving motion between the relieving tool and the cutter as the cutter rotates under the tool, or by using a formed grinding wheel or milling cutter and relief-grinding or cutting the tops of the blades by rotating the formed wheel or cutter in engagement with a blade while holding the cutter stationary on its axis. With the latter method, when one blade has been relieved, the cutter is indexed to bring another blade into position to be relieved. In either case, the relieving tool is displaced radially of the cutter for the relieving of successive blades of the cutter in order to obtain the desired spiral arrangement of the top cutting edges of the cutter.

As already stated, the sides of the roughing blades are preferably made straight and to mill or grind the sides, a cylindrical grinding wheel or milling cutter is preferably employed. This milling cutter or grinding wheel is continuously advanced axially of the cutter in one direction or the other, during the grinding or milling of the sides of the blades, so as to produce the relief on the sides of the blades and the desired displacement of the successive side-cutting edges relative to one another. The advance motion is in one direction for one side of the blades and in the opposite direction for the other side of the blades.

A cam, which is permanently secured to the cutter, may be provided to control the displacement of the grinding wheel or milling cutter in the grinding or milling of both sides of the roughing blades. This same cam may be employed also to control the sharpening of the blades. In the sharpening operation, a grinding wheel is passed back and forth across the front face of a blade to grind that blade back the desired distance to provide a new sharp cutting edge. The cutter is held stationary during the sharpening of any given blade and is indexed from blade to blade for the sharpening of the different blades. The cam, which is secured to the cutter, may be engaged with a follower which is secured to a slide on which the grinding wheel is mounted so that the depth of engagement of the grinding wheel with successive blades of the cutter may be controlled by this cam. By making the cam of proper shape, the depth of engagement of the wheel can be so controlled that successive blades will be ground to the same depth despite the fact that their top cutting edges are arranged on a spiral about the axis of the cutter.

In the drawings:

Fig. 10 is a developed sectional view of three successive roughing blades of a cutter made according to this invention;

Fig. 11 is a more or less diagrammatic view illustrating one method of grinding the sides of the roughing blades of a cutter constructed according to this invention;

Fig. 12 is a diagrammatic view illustrating the grinding of the opposite sides of the blades of this cutter; and Fig. 13 is a diagrammatic view illustrating a somewhat modified form of apparatus from that shown in Figs. 11 and 12.

Figure 1:
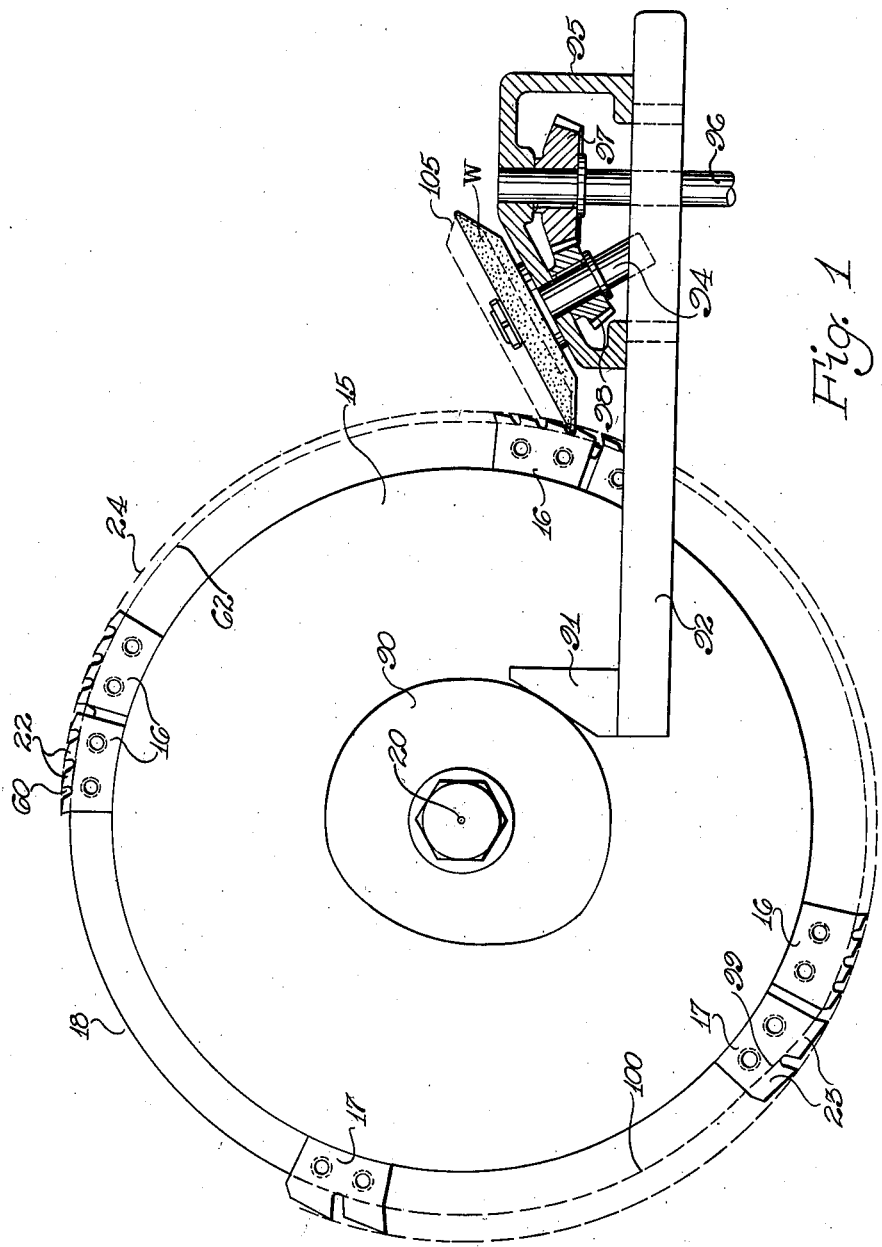
Fig. 1 shows, in side elevation, a cutter made according to one embodiment of this invention and illustrates diagrammatically one method of grinding the tops and one method of sharpening the front faces of the blades of this cutter.

The cutter illustrated in Fig. 1 is of the segmental type and comprises a rotary head 15 to which are secured a plurality of rough-cutting segments 16 that are followed by a plurality of finish-cutting segments 17. There is a peripheral gap 18 between the last finish-cutting segment and the first rough-cutting segment which is of sufficient angular extent to permit of indexing the gear blank, when the gap in the cutter is abreast of the blank, without withdrawal of the cutter from its depthwise cutting position.

In the embodiment illustrated in the drawings, each of the rough-cutting segments is provided with four integral cutting teeth 22 and each of the finish-cutting segments is provided with two integral cutting teeth 23. The top-cutting edges of the roughing blades are arranged on a spiral 24 so that they are at successively increasing distances from the axis 20 of the cutter. The top cutting edges of the finishing blades may be arranged on this same spiral 24 or on a different spiral according to the principles of my prior applications.

In the cutter of the present invention, as already stated, the roughing blades or teeth 22 cut with their top cutting edges only.

Figure 2:
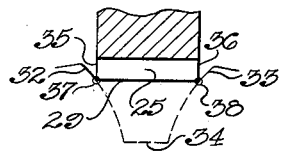
Figs. 2, 3 and 4 are views of three different rough-cutting blades of this cutter and illustrate diagrammatically how the cutter operates to rough out a tooth space of the desired profile shape.
Figure 3:
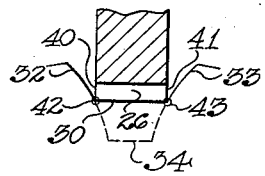
Figure 4:
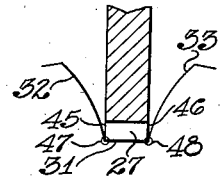

In the preferred construction, the cutting blades or teeth are made with sides of straight profile, the side profiles of the blades or teeth being perpendicular to the axis of the cutter. This is clearly illustrated in Figs. 2 to 4 inclusive. Fig. 2 shows one of the first roughing blades or teeth 25 of the cutter in operation cutting a tooth space whose sides are denoted at 32 and 33 and whose bottom is designated at 34. Fig. 3 shows a blade or tooth 26 which is at a mean point in the roughing portion of the cutter, cutting in this same tooth space, and Fig. 4 a blade or tooth 27, which is at the end of the roughing portion of the cutter, in operation on this tooth space. Each of the blades 25, 27 and 27 has a straight top-cutting edge parallel to the axis of the cutter, but the top cutting edges 29, 30 and 31, respectively, of the blades 25, 27 and 27 are of different widths to conform to the width of the tooth space at the point in the height of the tooth space at which the blade is to cut.

The sides of the cutting blade 25 are denoted at 35 and 36. They are of straight profile and intersect the top-cutting edge 29 of the blade in points 37 and 38, respectively, which lie on the profiles 32 and 33 of the tooth space being cut. The blade 26, which is intended to cut at a point further down in the tooth space of the gear blank, has a narrower top-cutting edge 30 than the blade 25, and the straight sides 40 and 41 of this blade 26 intersect the top-cutting edge 30 of the blade in points 42 and 43, respectively, which also lie on the profiles 32 and 33 of the roughed tooth space. The blade 27, which is to cut at the bottom of the tooth space, has sides 45 and 46 of straight profile which intersect the top-cutting edge 31 of the blade in points 47 and 48 which lie at the bases of the profiles 32 and 33 of the roughed out tooth space.

Blades intermediate blades 25 and 26, and blades intermediate blades 26 and 27 have top-cutting edges of widths determined by the width of the roughed tooth space at the point where these blades are to cut. In other words, the intersection points of the sides of any roughing blade with the top-cutting edge of that blade lie on the profiles 32 and 33 which are to be roughed out. The distance between the sides of successive blades varies, therefore, in accordance with the positions of the top-cutting edges of these blades radially of the axis of the cutter.

The roughing blades are preferably so formed that the corresponding side surfaces of the blades lie in a continuous helical surface of changing lead and the two helical surfaces forming the opposite sides of the blades converge toward one another from the first roughing blade to the last. This is illustrated clearly in Fig. 10 but on a somewhat exaggerated scale. 50, 51 and 52 denote three successive roughing blades of a cutter. It is to be denoted that the side surfaces 53, 54 and 55 at one side of the blades all lie in the same helical surface 56 while the opposite side surfaces of these blades all lie in a helical surface 57. The two helical surfaces 56 and 57 converge toward one another from the first roughing blade to the last. The convergence of these helical surfaces provides, of course, some side clarance behind the front face of each blade.

While the angle of rearward convergence of the sides of the blades is considerably less than would be provided for blades that have side-cutting edges, it provides sufficient side relief or clearance for the blades inasmuch as the rough-cutting blades cut with their top-cutting edges only. As a matter of fact, the side relief or clearance provided on the blades of the cutter for cutting gears according to this invention is even less necessary than on the blades of a keyway broach but the relief or side clearance provided in a cutter of the present invention definitely assures against any rubbing of the sides of the blades on the tooth surfaces being cut.

Further than this, as shown in the drawings, the top cutting edges of the blades may intersect the sides of the blades at sharp angles and no round is necessary at the points of intersection of the sides and top edges of the blades. The blades are top-cutting blades only.

Since the roughing blades are top-cutting blades only, they need only be sharpened to a shallow depth as compared with the depth of the tooth spaces to be cut, and moreover, they can be all sharpened to the same depth. This is clearly illustrated in Figs. 2 to 4 inclusive where it will be seen that the front faces of each of the blades 25, 26 and 27 are of equal depth but of shallow depth as compared with the depth of the tooth space to be cut. The gashes 60 which separate the cutting teeth of the roughing segment 16 can, therefore be made of uniform depth and the bottoms of these gashes will be tangent then to a spiral 62 which is equidistantly spaced from the spiral 24 that contains the top-cutting edges of the blades or teeth.

Because of the shallow depth of the gashes 60, a greater number of cutting teeth or blades can be provided in a roughing segment 16 than is possible with prior types of cutters. This makes for a more efficient and a longer lived cutting tool.

If the cutter is a combined roughing and finishing cutter, the finishing blades will be made the same as in prior types of cutters with profile shapes determined by the points along the length of the gear tooth at which they are to finish-cut. They will have the same pitch, that is, they will be spaced apart the same distances as in the prior types of cutter and consequently will have a coarser pitch, that is, be spaced a greater distance apart than the roughing blades. For convenience in sharpening, the pitch of the finishing blades may be made twice that of the roughing blades. Other proportions are, however, also quite feasible. The outside spiral 24 of the cutter may be made such as to give a constant chip thickness at the start of the chip as each blade cuts.

Figure 5:
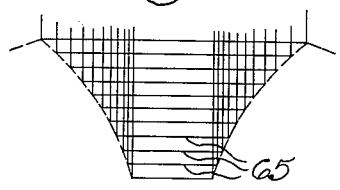
Fig. 5 is a diagrammatic view showing superimposed upon one another the roughing blades of a cutter made according to this invention for cutting spur gears.
Figure 6:
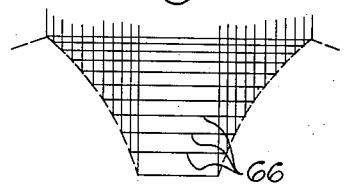
Fig. 6 is a corresponding view showing superimposed upon one another, the roughing blades of a cutter made according to this invention for cutting bevel gears.

In Fig. 5, I have shown the roughing blades of a cutter, which is suitable for cutting spur gears, superimposed upon one another in the same axial cutter plane, and in Fig. 6 I have shown superimposed upon one another the roughing blades of a cutter suitable for cutting bevel gears. It will be noted that in each instance, the roughing blades in the aggregate rough out profile shapes conforming to the shape of the tooth spaces to be cut and that the widths of the top-cutting edges of successive blades vary in accordance with the angular positions of the blades about the axis of the cutter. It is to be noted further that the width of the top-cutting edges changes at a rate decreasing from the first to the last blade. In the spur gear cutter shown in Fig. 5, it will be noted that the top-cutting edges 65 of the rough-cutting blades are spaced uniformly apart in a radial direction to give constant chip thicknesses. In the cutting of a spur gear, the cutter is preferably rotated in a fixed position lengthwise of the tooth space during the roughing out of the tooth space. Bevel gears are preferably roughed out by moving the rotating cutter along the length of the tooth space preferably beginning at the small end of the tooth space and moving toward the large end thereof. This movement will be greater than the length of the tooth space as will be clear from my prior applications. Analysis shows that the top cutting edges 66 of the roughing blades of the bevel gear cutter should be at progressively increasing distances from one another, as illustrated in Fig. 6, in order to cut chips of constant thickness at the start of the cut of each blade.

Figure 7:
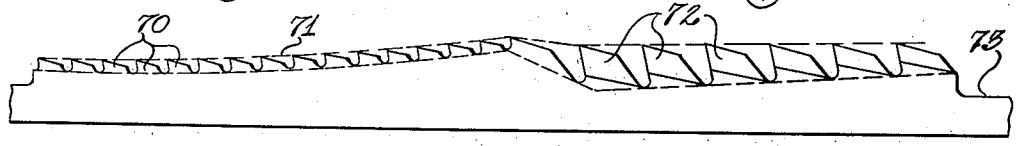
Fig. 7 is a diagramamtic developed view of a cutter made according to this invention for rough and finish-cutting bevel gears.

Fig. 7 shows a combined roughing and finishing cutter for bevel gears in development with the pitch or distance between the blades grossly exaggerated as compared with the circumference of the cutter. The roughing blades 70 of this cutter are of uniform height but each of a height less than the depth of the tooth space to be roughed and their top-cutting edges are arranged on a spiral 71 of gradually increasing lead for the reasons already given with reference to Fig. 6. The finishing blades 72 have a changing cutting depth and are here shown as having a pitch which is twice that of the roughing blades. The finishing blades are, of course, of concave profile shape to finish-cut the desired convex profile shapes on the tooth surfaces of the gear according to the principles of my prior applications. There is a gap 73 between the last finishing blade and the first roughing blade to permit of indexing the gear blank without relative withdrawal of the cutter from the blank.

Figure 8:
Fig. 8 is a corresponding view of a cutter for rough and finish-cutting spur gears.

In Fig. 8, a developed view of a spur gear cutter for rough and finish-cutting is shown. This cutter has a plurality of roughing blades 75 whose top-cutting edges are arranged in a spiral 76 of constant lead. The finishing blades of this cutter are denoted at 77. Their top cutting edges ordinarily will be arranged on a circle concentric with the cutter axis, but may also be arranged on a spiral. The roughing blades have a constant depth, the spiral 78, which is tangent to the bottoms of the gashes 79, being equi-distantly spaced from the spiral 76 which contains the top-cutting edges of these blades. The finish-cutting blades 77 are also made of uniform depth and the circle 80 in which the tops of the finish-cutting blades are arranged is equidistant from the circle 82 which is tangent to the bottoms of the gashes 83 which form the front faces of the finishing blades. A gap 81 is provided between the last finishing blade and the first roughing blade for indexing.

Figure 9:
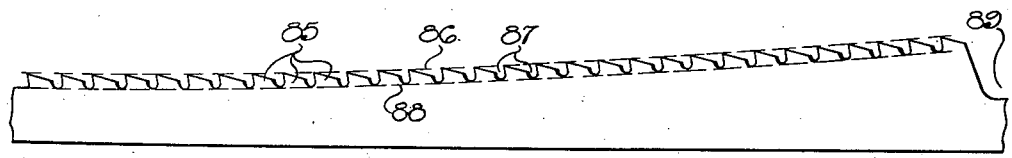
Fig. 9 is a diagrammatic view showing in development a roughing cutter made according to this invention for roughing bevel gears.

Fig. 9 shows a bevel gear roughing cutter in development. This cutter has no finishing blades. The top-cutting edges of the roughing blades 85 are arranged in a spiral 86 which is of gradually increasing lead for the reasons already given. The blades are again of uniform depth, however, the bottoms of the gashes 87 between the cutting teeth being tangent to a spiral 88 which is equidistant from the spiral 86. The depth of the gashes 87 is smaller, as before, than the depth of the tooth space to be cut. An indexing gap 89 is provided between the last and the first blade of the cutter.

One way of sharpening a cutter to obtain roughing blades or teeth of uniform depth is illustrated in Fig. 1. For the sharpening operation, a sharpening machine such as described in the pending application of Clarence T. Galloway, Serial No. 216,553, filed June 29, 1938, may with slight modification be employed. This machine uses a conical grinding wheel, and the sharpening operation is effected by rotating the wheel on its axis and simultaneously swinging it back and forth to pass it across the front face of the tooth or blade to be sharpened. When one blade has been sharpened back to the desired extent, the grinding wheel is withdrawn from engagement with the cutter, the cutter is indexed to bring a new blade into position and then the wheel is returned into engagement with the cutter for sharpening the new blade. This machine may, as stated, be employed with slight modification for sharpening blades of cutters constructed according to the present invention. The modification required is the provision of means for controling the depth of engagement of the grinding wheel to cause the wheel to grind the front faces of the successive blades to uniform depth so that the bottoms of the gashes will follow the spiral that contains the top-cutting edges of the blades and be equidistantly spaced therefrom.

Various means may be provided for so controlling the radial distance of the grinding wheel from the axis of the cutter. A very simple control is provided by permanently securing to the cutter a cam 90 whose periphery is shaped to properly control the position of the grinding wheel. A follower 91 is adapted to be engaged with the cam 90. The follower 91 is secured in any suitable manner to the slide or carriage 92 on which the grinding wheel is mounted. This slide or carriage may be the same as that employed for moving the grinding wheel to and from operative engagement with the cutter, or it may be in addition thereto.

The grinding wheel W is here shown as secured to a spindle 94 that is journaled in an oscillatable head 95 which is journaled in the carriage or slide 92. The grinding wheel is driven from the shaft 96 through the bevel gearing 97—98. The wheel may be oscillated back and forth to pass the rotating wheel back and forth across the face of the blade by a crank or other similar means as shown in the Galloway application above mentioned. A piston and cylinder or similar means may be employed for moving the slide or carriage 92 to and from operative position. The cam 90 acts as a stop governing the distance of the grinding wheel from the axis 20 of the cutter in the grinding of successive blades of the cutter. When one blade of the cutter has been sharpened, the carriage 92 is withdrawn to withdraw the grinding wheel from operative position and then the cutter is indexed by rotating it on its axis 20. In the indexing operation, the cam 90, which is secured to the cutter, rotates with the cutter. Hence, when the carriage 92 is returned to operative position after indexing is completed, the follower 91 engages with a new part of the peripheral surface of the cam 90. The cam 90, as already described, has its peripheral surface formed with a spiral as determined by the spiral 24 which contains the top-cutting edges of the blades. Hence the cam 90 will control the position of the grinding wheel so that on successive sharpenings of the blades of the cutter, the wheel will follow the spiral 24 and grind front faces on the roughing blades of uniform depth.

Both the roughing and finishing blades of a cutter may be ground in the same set up by properly shaping the control cam 90. The finishing blades are preferably spaced apart a distance twice the pitch of the roughing blades, for convenience in sharpening. The cutter will then be indexed the angular distance between two of the roughing teeth, and every other roughing tooth and all of the finishing teeth will be sharpened on the first time around the cutter. Then the cutter will be readjusted relative to the grinding wheel so that the remaining roughing teeth can be sharpened on the second time around.

The finishing blades of the cutter are, of course, of greater height than the roughing blades, but the depth of the gashes or front faces of the finishing blades can readily be controlled by properly shaping the periphery of the cam 90. To avoid too sharp an angle on the cam surface, the first two finishing blades may be made of gradually increasing height, as indicated by the dotted line 99, which denotes the connecting portion between the spiral 62, which is tangent to the bottoms of the gashes of the roughing blades, and the spiral 100, which is tangent to the bottom of the full height finishing blades.

In the manufacture of the cutter, the tops of the blades may be ground on any suitable form of relieving grinder to have the necessary cutting clearance or relief back of the top-cutting edges. The blade tops may also be ground on the cutter sharpener itself by using a formed wheel such as denoted in dotted lines at 105. The active surface of this wheel is shaped to give necessary relief on the tops of the cutting blades. Such a wheel is simply rotated on its axis and simultaneously swung back and forth across the tops of the blades. The cutter is held stationary on its axis, during the grinding of the tops of the blades, and is indexed after the top of each blade has been found. As before, the cam 90 may serve to control the position of the wheel for grinding the tops of the different blades. If desired, the tops and front cutting faces of the blades may be ground simultaneously with a single wheel of proper shape.

One way of grinding the radial side surfaces of the roughing blades of the cutter is illustrated in Figs. 11 and 12. 110 denotes the head in which the roughing blades, which are to be ground, are mounted. This may be either the cutter head itself or a dummy head. 111 is the axis of this head. A cam 112 may be employed to control the side grinding operation.

For this operation, a cylindrical grinding wheel 114 is employed. The grinding wheel is secured to a spindle 115. This spindle may be rotated through any suitable means. It is journaled in a head or block 116 that is mounted on a slide 117 for lateral adjustment thereon.

Fig. 11 shows the grinding of one side of the blades and Fig. 12 the grinding of the opposite sides. The cam 112 is adapted to act on an abutment member formed by one end face of a bar 118. This bar has a lower inclined end 119 which bears on the upper inclined face 120 of a follower 122 which is secured to the carriage 117.

In the grinding of the sides of the roughing blades, the grinding wheel 114 is rotated on its axis in continuous engagement with the cutter, and the cutter itself is rotated continuously on its axis. As the cutter rotates on its axis, then, the cam 112 moves the slide 118 downwardly in the direction of the arrow 123 and this motion is in turn transmitted through the abutment 122 to the carriage 117 to move the carriage laterally in the direction of the arrow 124, parallel to the cutter axis 111. Thus, as the cutter rotates on its axis, the grinding wheel is fed in a direction parallel to the axis and a continuous helical surface of changing lead is produced on one side of the cutter which contains the cutting edges of successive roughing blades and also the side surfaces of these blades. Thus, clearance is produced on the sides of the individual blades, as already described with reference to Fig. 10, and at the same time the corresponding sides of successive blades are displaced from one another in accordance with the positions at which these blades are to cut into the tooth spaces of the gear blank.

For grinding the opposite side of the roughing blades, the bar 118 and its mate 122 are turned around and the grinding wheel 114 is readjusted to bring it into engagement with the opposite side of the cutting blades. Then when the cutter is rotated on its axis 11 under the rotating grinding wheel, the cam 112 will cause the carriage 117 to be moved laterally in the direction of the arrow 125 (Fig. 12) to cause the grinding wheel to produce the continuous displacement of the cutting edges of successive roughing blades and the desired clearance on the individual blades.

In Fig. 13, a modification of the invention is illustrated in which the same cam 130 may be employed for the grinding the side surfaces of the blades, as is used to control the sharpening of the blades. In this case, the bar 131, which bears against the periphery of the cam, carries at its lower end a roller 132 which engages a roller 133 that is secured in the carriage 135 on which the grinding wheel 136 is journaled. The diameter of one of the rollers 132 or 133 is made to suit the given cutter which is to be ground. In this way, the radial motion 137 may be transmitted to the carriage 135 at a rate decreasing with increasing cutter radius so that sides may be ground on the roughing blades and the roughing blades in the aggregate may cut a circular tooth profile in a gear blank.

There are several advantages in grinding the sides of the roughing blades according to the method and with apparatus such as illustrated in Figs. 11 to 13. A much larger grinding wheel 114 or 136 can be employed than in an ordinary relieving process because the sides of the blades are ground as part of a continuous surface and the diameter of the wheel does not have to be kept small enough to clear successive blades. Further than this, the absence of a relieving motion permits of grinding the side surfaces of the roughing blades very quickly and accurately and at low cost.

In a cutter, which is to be used for both rough and finish-cutting, the roughing blades will ordinarily be ground in a separate dummy head, two sets being ground simultaneously. The finishing blades are also ground preferably two sets at a time.

On account of the simple straight line shape of the roughing blades of a cutter made according to this invention, it is possible to employ inserts of tungsten carbide or similar hard cutting material in the roughing blades particularly on cutters which are used for rough-cutting only.

While the invention has been described in connection with particular embodiments thereof, it will be understood that it is capable of further modification and use and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A rotary gear cutter having a plurality of rough-cutting blades arranged part-way around its periphery, each of said blades having a top-cutting edge, successive blades being of progressively decreasing width and having their top-cutting edges arranged at progressively increasing distances from the axis of the cutter, said blades being all of equal height.

2. A rotary gear cutter having a plurality of rough-cutting blades arranged circularly part-way around its periphery, each of the blades having a top-cutting edge and the top-cutting edges of successive blades being arranged in a spiral about the axis of the cutter and being of varying widths such that the points of intersection of corresponding sides of different blades with the top-cutting edges of the blades lie on the profile of the tooth space to be cut or on a curve parallel thereto, 3. A rotary gear cutter having a plurality of rough-cutting blades arranged circularly part-way around its periphery, each of the blades having a top-cutting edge and sides of straight profile perpendicular to the top-cutting edge, the top-cutting edges of successive blades being arranged in a spiral about the axis of the cutter and being of progressively decreasing width, the points of intersection of corresponding sides of different blades with the top-cutting edges of such blades lying on the profile of the tooth space to be cut or on a curve parallel thereto.

4. A rotary disc gear cutter having a plurality of cutting blades arranged part-way around its periphery which are of continuously increasing height and continuously decreasing width, opposite sides of each of said such blades being helical surfaces of changing lead which converge toward one another from front to rear of the blades, corresponding sides of successive blades lying in the same helical surface.

5. A rotary gear cutter having a plurality of radially arranged cutting blades which are of progressively decreasing width and have top-cutting edges at progressively increasing distances from the axis of the cutter, said blades being of uniform height so that the bottoms of the blades are arranged on a spiral that is equidistantly spaced from the spiral containing the top-cutting edges of the blades.

6. A tool for rough-cutting gears having a plurality of cutting blades or teeth that have top-cutting edges only, the top-cutting edges of successive blades being displaced relative to one another in the direction of tooth depth and being of varying width, said blades having straight sides perpendicular to the tops of the blades, the points of intersection of the sides of the blades with the top-cutting edges of the blades lying on the profile of the tooth space to be roughed or on a curve parallel thereto.

7. A rotary gear cutter of disc form having a plurality of circularly arranged cutting blades which have cutting edges of progressively reduced width arranged spirally on its outside periphery, the width of said cutting edges changing at a rate decreasing from the first to the last of said blades.

8. A rotary gear cutting tool of disc form, having a plurality of circularly arranged blades having top cutting edges of progressively reduced width arranged on its outside periphery, said cutting edges being formed on cutting teeth by relieving the top surfaces of teeth whose opposite side surfaces lie, respectively, in the same helical surface, the helical surfaces for opposite side surfaces of the teeth being of opposite helical hand.

9. A rotary gear cutter having a plurality of circularly arranged cutting blades, said blades being of progressively varying width and having top-cutting edges that are progressively displaced relative to one another in the direction of tooth depth to cut a tooth space having a given profile shape, opposite sides of the blades having pressure angles less than the sides of the tooth spaces to be cut, and each of the blades being relieved on its side and top surfaces.

10. A rotary gear cutter having a plurality of circularly arranged cutting blades, said blades being of progressively decreasing width and having top-cutting edges that are progressively displaced relative to one another in the direction of tooth depth to cut a tooth space having a given profile shape, opposite sides of the blades having pressure angles less than the sides of the tooth spaces to be cut, and each of the blades being relieved on its top and side surfaces.

11. A rotary gear cutter having a plurality of circularly arranged cutting blades whose top cutting edges are arranged in a spiral, corresponding side surfaces of successive blades lying in the same helical surface, and the two helical surfaces, which contain the opposite sides of the blades, converging toward one another from the first to the last of said blades.

12. A rotary gear cutter having a plurality of circularly arranged cutting blades whose top cutting edges are arranged in a spiral, corresponding side surfaces of successive blades lying in the same helical surface which is of changing lead, and the two helical surfaces, which contain opposite sides of the blades, converging toward one another from the first to the last of said blades.

13. The combination with a rotary disc gear cutter having a plurality of cutting blades whose top-cutting edges are arranged in a spiral about the axis of the cutter and whose corresponding side surfaces are laterally displaced from one another, of a cam secured to the cutter, said cam having an operating surface which is arranged in a spiral about the axis of the cutter, the lead of which is equal to the lead of the spiral in which the top-cutting edges of the blades are arranged.

14. The combination with a rotary gear cutter having a plurality of cutting blades whose top-cutting edges are arranged in a spiral of changing lead, of a cam secured to the cutter, said cam having an operating surface arranged on a spiral of the same changing lead as the top-cutting edges of the blades.

15. A rotary gear cutter having a plurality of circularly arranged rough-cutting blades, said blades being of progressively decreasing width and having their top cutting edges arranged on a spiral to cut successively at progressively greater depths into the tooth spaces of a gear blank.

16. A rotary gear cutter having a plurality of circularly arranged rough-cutting blades, said blades being of progressively decreasing width and having their top cutting edges arranged on a spiral of varying lead to cut successively at progressively greater depths into the tooth spaces of a gear blank.

17. A rotary gear cutter having a plurality of circularly arranged rough-cutting blades, said blades being of progressively decreasing width and having their top-cutting edges arranged on a spiral of uniform lead to cut successively at progressively greater depths into the tooth spaces of a gear blank.

18. A rotary gear cutter having a plurality of rough-cutting blades followed by a plurality of finish-cutting blades arranged circularly part way around its periphery, the rough-cutting blades being of progressively decreasing width and having their top cutting edges arranged on a spiral to cut successively at progressively greater depths into the tooth spaces of a gear blank, the finishing blades being of concave profile shape, and the pitch of the spacing of successive finishing blades being a multiple of the pitch of the spacing of successive roughing blades.

19. A rotary gear cutter having a plurality of circularly arranged roughing blades, said blades having side surfaces inclined to the axis of the cutter at an angle less than the pressure angle of the tooth surfaces to be cut and being of progressively decreasing widths and having their top cutting edges arranged on a spiral to cut successively at progressively greater depths into the tooth spaces of a gear blank, the width and arrangement of the top cutting edges of successive blades being so selected that, when the blades are projected into a common axial plane of the cutter, the points of intersection of the corresponding sides and top of the blades lie on a curve identical with or parallel to the tooth profile to be cut.

20. A rotary gear cutter having a plurality of rough cutting blades followed by a plurality of finish cutting blades arranged circularly part way around its periphery, the rough cutting blades having side surfaces inclined to the axis of the cutter at an angle less than the pressure angles of the tooth surfaces to be cut and being of progressively decreasing width and having their top cutting edges arranged on a spiral to cut successively at progressively greater depths into the tooth spaces of a gear blank, the widths and arrangement of the top cutting edges of successive roughing blades being so selected that, when the blades are projected into a common axial plane of the cutter, the points of intersection of the corresponding sides and tops of the roughing blades lie on a curve identical with or parallel to the tooth profile to be cut, the finishing blades being of concave profile shape, and the pitch of spacing of successive finishing blades being a multiple of the pitch of spacing of successive roughing blades.

21. A rotary gear cutter having a plurality of roughing blades whose tip cutting edges are arranged in a spiral at progressively increasing distances from the axis of the cutter, said blades being of progressively decreasing point-width and having their opposite sides perpendicular to the tip cutting edges thereof.

22. A rotary gear cutter having a plurality of roughing blades which are of progressively decreasing point-width and of uniform height, and whose tip cutting edges are arranged in a spiral at progressively increasing distances from the axis of the cutter, opposite sides of the roughing blades being perpendicular to the tip cutting edges thereof.

23. A rotary disc gear cutter having a plurality of roughing blades whose tip cutting edges are arranged in a spiral at progressively increasing distances from the axis of the cutter, said blades being of decreasing point-width and having opposite sides which are perpendicular to the tip cutting edges thereof and which are symmetrical with reference to a plane perpendicular to the axis of the cutter.

24. A rotary disc gear cutter having a plurality of roughing blades which are of progressively decreasing point-width and uniform height, and whose tip cutting edges are arranged in a spiral at progressively increasing distances from the axis of the cutter, opposite sides of the roughing blades being perpendicular to the tip cutting edges thereof, and being symmetrical with reference to a plane perpendicular to the axis of the cutter.

25. A rotary disc gear cutter having a plurality of roughing blades whose tip cutting edges are arranged in a spiral at progressively increasing distances from the axis of the cutter, said blades being of progressively decreasing point-width, opposite sides of said blades being perpendicular to the tip cutting edges thereof, and being symmetrically disposed with reference to a plane of rotation perpendicular to the axis of the cutter, corresponding sides of successive blades lying in the same helical surface, and the two helical surfaces which form opposite sides of the blades, converging toward one another from the first blade to the last.

26. A rotary gear cutter having a plurality of roughing blades followed by a plurality of finishing blades, the roughing blades having top cutting edges arranged in a spiral at progressively increasing distances from the axis of the cutter and being of progressively varying point width, opposite sides of the roughing blades having a smaller inclination to the axis of the cutter than corresponding side-cutting edges of the finishing blades, and the finishing blades having their opposite side-cutting edges offset with reference to corresponding opposite sides of the roughing blades.

27. A rotary gear cutter having a plurality of roughing blades followed by a plurality of finishing blades, the roughing blades having tip cutting edges arranged in a spiral at progressively increasing distances from the axis of the cutter and being of progressively decreasing point-width, opposite sides of the roughing blades being perpendicular to the tip cutting edges of said blades, and the finishing blades having their opposite side cutting edges offset with reference to corresponding opposite sides of the roughing blades.

ERNEST WILDHABER.